US012645476B1

(12) United States Patent
Pagl et al.

(10) Patent No.: US 12,645,476 B1
(45) Date of Patent: *Jun. 2, 2026

(54) RESOURCE MANAGEMENT IN A VIRTUAL MACHINE CLUSTER

(71) Applicant: Scale Computing, Inc., Austin, TX (US)

(72) Inventors: Aaron Pagl, San Carlos, CA (US); NAte Hardt, San Carlos, CA (US)

(73) Assignee: Scale Computing, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/889,197

(22) Filed: Feb. 5, 2018

Related U.S. Application Data

(63) Continuation of application No. 14/554,008, filed on Nov. 25, 2014, now Pat. No. 9,928,092.

(51) Int. Cl.
| | |
|---|---|
| *G06F 9/44* | (2018.01) |
| *G06F 9/455* | (2018.01) |
| *G06F 9/50* | (2006.01) |
| *G06F 11/07* | (2006.01) |

(52) U.S. Cl.
CPC ........ *G06F 9/45558* (2013.01); *G06F 9/5077* (2013.01); *G06F 11/07* (2013.01); *G06F 9/45533* (2013.01); *G06F 2009/4557* (2013.01); *G06F 2009/45579* (2013.01)

(58) Field of Classification Search
CPC ............. G06F 9/45558; G06F 9/45533; G06F 9/45579; G06F 9/4557; G06F 9/5077; G06F 11/07
See application file for complete search history.

(56) References Cited

U.S. PATENT DOCUMENTS

| | | | | |
|---|---|---|---|---|
| 9,378,044 | B1 * | 6/2016 | Gaurav | G06F 9/5077 |
| 2010/0191854 | A1 * | 7/2010 | Isci | G06F 9/4893 |
| | | | | 718/1 |
| 2012/0324183 | A1 * | 12/2012 | Chiruvolu | G06F 11/2097 |
| | | | | 711/E12.103 |
| 2019/0188047 | A1 * | 6/2019 | Dao | G06F 9/5038 |

* cited by examiner

*Primary Examiner* — Hanh Thi-Minh Bui

(74) *Attorney, Agent, or Firm* — Kowert, Hood, Munyon, Rankin & Goetzel, P.C.; Jeffrey C. Hood; Matthew C. Washburn

(57) ABSTRACT

Managing resources in a VM cluster; allocation of resources among competing VMs. Assigning VMs to real devices, responsive to needs for resources: processor usage, disk I/O, network I/O, memory space, disk space. Assigning VMs responsive to needs for cluster activity: network response latency, QoS. Using predictive models of resource usage by VMs. Transferring VMs, improving utilization. Failing-soft onto alternative VM resources. Providing a resource buffer for collective VM resource demand. Transferring VMs to a cloud service that charges for resources.

14 Claims, 3 Drawing Sheets

System 100

System 200

Method 300

RESOURCE MANAGEMENT IN A VIRTUAL MACHINE CLUSTER

RELATED APPLICATIONS

This Application describes technologies that can be used with inventions, and other technologies, described in one or more of the following Applications, each assigned to the same assignee:

U.S. Provisional Application 61/651,391, filed May 24, 2012, in the name of inventors Jason Collier, Scott Loughmiller, and Philip White, titled "Unified hypervisor and distributed fault-tolerant storage".

U.S. application Ser. No. 13/901,325, filed May 23, 2013, in the name of inventors Jason Collier, Scott Loughmiller, and Philip White, titled "Unified hypervisor and distributed fault-tolerant storage", .

Each and every one of these documents, as well as all documents cited therein, are hereby incorporated by reference as if fully recited herein.

This Application claims priority of the Incorporated Documents, and to each and every document cited therein, to the fullest extent possible.

No aspect of incorporating these documents by reference is intended to be limiting in any way. The scope and spirit of the invention remains as broad as possible, given the specification and original claims of this Application. These Incorporated Documents are additive in nature, and can be combined with the technical matter described herein, in whole or in part.

INCORPORATED DISCLOSURES

This Application describes technologies that can be used with inventions, and other technologies, described in one or more of the following Applications, each assigned to the same assignee:

Application 61/909,118, filed Nov. 26, 2013, in the name of Scott Loughmiller and Philip White, titled "Reduplication of de-duplicated files in a fault-tolerant distributed cluster".

Application 61/909,301, filed Nov. 26, 2013, in the name of Aaron Pagel and Nate Hardt, titled "Resource management in a virtual machine cluster".

Application 61/909,336, filed Nov. 26, 2013, in the name of Aaron Pagel and Nate Hardt, titled "Resource management in a virtual machine cluster".

Application 61/909,342, filed Nov. 26, 2013, in the name of Aaron Pagel and Nate Hardt, titled "Resource management in a virtual machine cluster".

Application 61/909,344, filed Nov. 26, 2013, in the name of Nate Hardt, Scott Loughmiller, and Philip White, titled "Unanticipated operational requirements in a reliable distributed computing system".

Application 61/909,365, filed Nov. 26, 2013, in the name of Nate Hardt, Scott Loughmiller, and Philip White, titled "Recovery after data loss in a reliable distributed computing system".

Application 61/909,352, filed Nov. 26, 2013, in the name of Nate Hardt, Scott Loughmiller, and Philip White, titled "Metadata caches in a reliable distributed computing system".

Application 61/909,356, filed Nov. 26, 2013, in the name of Nate Hardt, Scott Loughmiller, and Philip White, titled "Remote access latency in a reliable distributed computing system".

Application 62/080,773, filed Nov. 17, 2014, in the name of Clint McVey and Scott Loughmiller, titled "Zero memory buffer copying in a reliable distributed computing system".

Application 62/080,791, filed Nov. 17, 2014, in the name of Nate Hardt, Scott Loughmiller, and Philip White, titled "Virtual devices in a reliable distributed computing system".

Application No. 62/123,740, filed Nov. 25, 2014, in the name of Scott Loughmiller, Phillip White, Aaron Pagel, Nate Hardt, and Clint McVey, titled "Reliable Independent Block Engine and State Machine".

Each and every one of these documents, as well as all documents cited therein, are hereby incorporated by reference as if fully recited herein.

This Application claims priority of the Incorporated Documents, and to each and every document cited therein, to the fullest extent possible.

No aspect of incorporating these documents by reference is intended to be limiting in any way. The scope and spirit of the invention remains as broad as possible, given the specification and original claims of this Application. These Incorporated Documents are additive in nature, and can be combined with the technical matter described herein, in whole or in part.

BACKGROUND

Many enterprises centralize their information technology operations in "data centers", which perform computing operations and maintain storage on behalf of the enterprise's personnel. Computing operations are often performed by application servers, each of which is often executed within its own virtual machine (VM), an emulation of a physical machine, which can be executed by a physical computing device. Storage requirements are often provided by storage servers, which maintain blocks of storage that can be accessed by application servers and other devices using a network storage protocol.

It sometime occurs that it is difficult to allocate virtual machines to real devices (physical machines, which emulate those virtual machines). Although a set of multiple virtual machines can be allocated to a single real device, the real device cannot service demands made by that set, if those demands exceed the physical capacity of the real device.

It also sometime occurs that, even when virtual machines can all be allocated to real devices, it might occur that those virtual machines contend for resources available at the real device. This can have the effect of slowing those virtual machines, or otherwise making them less efficient.

Known methods include assigning virtual machines to each real device in a cluster so that requested memory usage is made to be as equal as possible. While this generally provides each virtual machine with its requested amount of memory, it can have the drawback of allocating other resources inefficiently. For example, it might occur that known methods allocate several virtual machines with heavy processor usage to the same real device.

SUMMARY OF THE DESCRIPTION

We provide a set of techniques that manage resources in a virtual machine cluster, such as the allocation of real and virtualized resources among multiple virtual machines that might be competing for those resources. For a first example, these techniques assign virtual machines to real devices, in response to their needs for multiple resources. These could include processor usage, disk I/O, network I/O, memory space, disk space, and otherwise. For a second example, these techniques assign virtual machines to respond to their needs for measures of cluster activity. These could include network response latency, QoS, and otherwise.

In one embodiment, a virtual machine manager measures use of resources over a period of time, and generates a model of resource usage by each virtual machine. Using this model, the virtual machine manager predicts a most efficient assignment of virtual machines to real devices, and assigns virtual machines to those real devices. For one example, the model might predict that a "daily work" product, such as an SQL server, has heaviest processor usage during the hours of 8:00 a.m. through 12:00 midnight, while a "background" product, such as a backup process, has heaviest processor usage during the hours of 12:00 midnight through 8:00 a.m. In such examples, the virtual machine manager could allocate most of a real device to the SQL server while it is active, and group the backup process with other low-priority virtual machines while it is not active.

In one embodiment, the virtual machine manager measures use of resources in real time, and determines if the current assignment of virtual machines to real devices can be improved. If so, the virtual machine manager transfers virtual machines between the real devices that control those resources, with the effect of improving utilization. For example, if the virtual machine manager might detect that virtual machines A and B are contending for processor time on a $1^{st}$ real device, while virtual machine C has more processor time than it needs on a $2^{nd}$ real device. In such examples, the virtual machine manager can transfer virtual machine A to the $2^{nd}$ real device, reducing the contention between A and B, and better utilizing processor resources cluster-wide.

In one embodiment, the virtual machine manager can provide fail-softness in the event some real device, or a part of it, becomes unavailable. For example, if a fast-disk device has a disk failure, the virtual machines assigned to that device might become under-served. In such examples, the virtual machine manager can transfer virtual machines that need fast disk I/O to slower real devices, while an operator replaces the fast disk I/O device.

In one embodiment, the virtual machine manager can provide a resource buffer in the event the set of virtual machines collectively demand more resources than feasibly available. In such examples, the virtual machine manager can provide resources from another cluster, whether located at another enterprise cluster, or remotely located in the cloud. For example, the virtual machine manager can transfer virtual machines to a cloud-based service that charges for virtual machine usage. In such cases, even paying for the overage might be less expensive to the cluster's owner than expanding the size of the cluster.

DETAILED DESCRIPTION

Terms and Phrases

Terms and phrases used herein are exemplary, not limiting in any way. Some examples of terms and phrases used herein include the following:

The text "cluster", and variants thereof, generally refers to any collection of real devices, operating together to form a distributed system, or provide a distributed service. For example, a fault-tolerant server cluster could include collection of nodes, each of which can maintain at least a portion of the data, and which is resistant to loss of a single disk drive or a single node.

The text "virtual machine", sometimes abbreviated "VM" herein, and variants thereof, generally refers to any emulated computing device. For example, a virtual machine could include a "guest operating system", which controls the virtual machine, and an application program that calls upon that guest operating system to provide access to the virtual machine, similar to an application program calling upon a real operating system to provide access to a real computing device.

FIGURES AND TEXT

Figure 1:
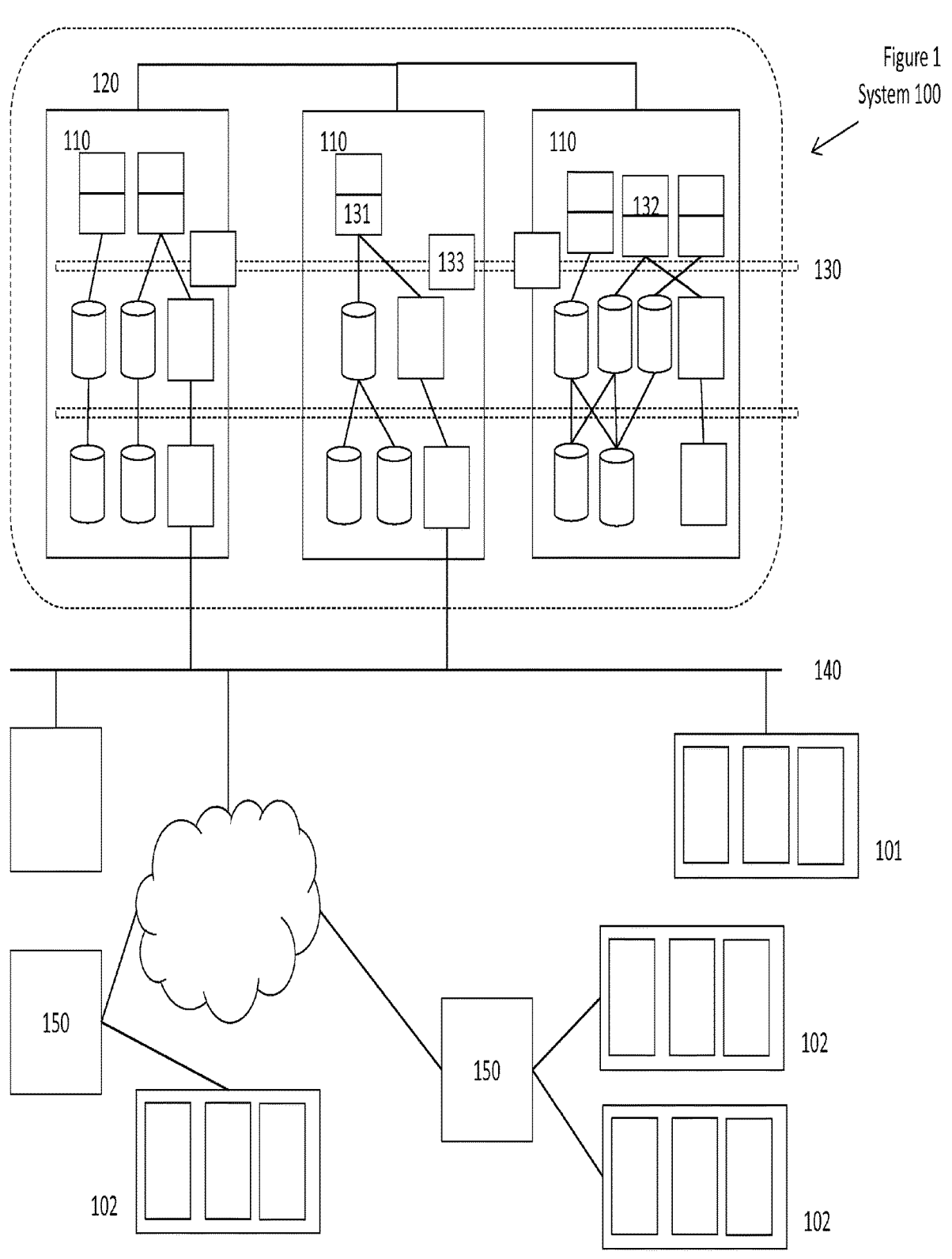
FIG. 1 shows a conceptual block diagram of a system.

FIG. 1 shows a conceptual block diagram of a system.

VIRTUAL MACHINE MANAGER

A $1^{st}$ cluster 100 includes elements shown in the figure, including at least multiple individual nodes 110 and an inter-node switch 120. Each individual node 110 includes a set of physical resources, including at least one or more processing elements, memories, storage elements, and network access ports, and optionally including other resources. Each node 110 in the cluster 100 includes substantially identical operating system software, at least part of which is resident (at least some of the time) in memory, and executed by one or more processors at that node 110. The substantially identical operating system software cooperates between nodes 110, such as by using the inter-node switch 120 and by being coded to have the same reactions to the same circumstances. This has the effect that the collected set of operating system software operates substantially as a single operating system for the cluster 100, and is sometimes referred to herein as the "cluster operating system" or "cluster OS".

The cluster operating system includes a hypervisor manager 130 at each node 110. The hypervisor manager 130 generates a separate hypervisor 131 for each virtual machine 132, and can control that separate hypervisor 131, such as by starting, stopping, pausing, or otherwise altering its operation. This has the effect that the hypervisor manager 130 can pause a virtual machine 132, transfer the data content of that virtual machine 132 and its hypervisor 131 to another node 110, and un-pause the virtual machine 132, all without the virtual machine 132 knowing of the transition.

The hypervisor manager 130 includes a virtual machine manager 133, each capable of cooperating with the others, such as to perform the functions described herein. (The virtual machine managers 133 at each node 110, acting in cooperation, are sometimes also collectively referred to herein as the cluster VM manager.) This has the effect that the cluster VM manager has access to each hypervisor manager 130, each hypervisor 131, each virtual machine 132, and each virtual machine manager 133, at each node 110. The cluster VM manager can effectively determine whether virtual machines 132 are in contention for resources at any node 110, and can reallocate those virtual machines 132 among the nodes 110 using the virtual machine managers 133.

As described herein, the real device (a particular node 110) provides real resources of various types, such as processor time, disk I/O, network I/O, memory space, disk space, and possibly otherwise. A virtual machine 132 might be relatively quiescent at one time, thus needing fewer virtual resources (and therefore fewer real resources) of most types, and might be relatively active at another time, thus needing more resources of some (but not necessarily all) types. The cluster VM manager and its individual virtual machine managers 133 attempt to assign virtual machines 132 to real devices (nodes 110) so that, at least at each moment, demand for any particular resource does not exceed supply at that node 110.

There are also resources a virtual machine 132 might need that the cluster 100 can provide by cooperative activity. These could include network response latency, network priority, QoS, and otherwise. For example, an application server providing video conferencing might have stringent requirements for network response latency. The virtual machine manager 133 attempts to assign virtual machines 132 to real devices (nodes 110) so that, at least at the moment, demand for any particular resource does not prevent the cluster 100, as a whole, from providing these capacities when asked for.

Resource Priorities

In one embodiment, the virtual machine manager 133 can assign virtual machines 132 to nodes 110 in response to selected resource priorities.

For example, an operator of the cluster 100 might assign which resources to give priority. If the operator has good knowledge of the application programs being executed by those virtual machines 132, the operator might also have good knowledge of best assignment based on resource priority.

For another example, the virtual machine manager 133 can assign virtual machines 132 to nodes 110 in dictionary order, where the "dictionary" is a list of possible resources. That order might be a default setting, or might be altered by an operator. In one such case, that order might be: $1^{st}$, disk I/O (that is, satisfy all disk I/O requirements before attempting to satisfy the next resource requirement), $2^{nd}$, disk space (that is, satisfy that resource requirement next), $3^{rd}$, network I/O, and otherwise.

For another example, the cluster VM manager and its virtual machine managers 133 can assign a measure of how well the assignment of virtual machines 132 to nodes 110 has been satisfied, for each such resource, compute a weighted average of those measures, and attempt to maximize that weighted average. In another such case, the operator might be able to provide a cost function that indicates how important it is to satisfy selected resource requests.

For another example, the cluster VM manager and its virtual machine managers 133 can measure use of resources by virtual machines 132 over a time duration, and generate a model of resource usage by each such virtual machine 132. In a $1^{st}$ such case, that duration might be as long as several days, with the effect of attempting to find a model of resource usage on an hourly basis. In a $2^{nd}$ such case, that duration might be as short as an hour, with the effect of attempting to find a model of resource usage each 5 minutes. As described herein, common workplace usage tends to distinguish between "daily work" application programs (such as e-mail, SQL, and web servers), "background" application programs (such as backup daemons), and "commodity" application programs (such as development and DNS servers). Knowing which category into which a virtual machine 132 fits, and knowing the time of day, could allow the virtual machine manager 133 to provide better utilization.

Assignment and Movement

In one embodiment, the virtual machine manager 133 can re-assign virtual machines 132 to nodes 110 in real time. For example, if the virtual machine manager 133 determines that the assignment of virtual machines 132 to nodes 110 is not good, it can transfer one or more virtual machines 132 between nodes 110 to reach a better assignment.

For example, the cluster VM manager and its virtual machine managers 133 can periodically measure the "goodness of fit" of assignment of virtual machines 132 to nodes 110. In the example of the model of resource usage, the cluster VM manager and its virtual machine managers 133 can periodically determine if it is time to switch from "daytime" assignments to "night-time" assignments. When that time occurs, the cluster VM manager and its virtual machine managers 133 can re-assign virtual machines 132 to different nodes 110, with the effect that application programs with new priority are assigned to real devices that are capable of servicing their requirements.

For example, the cluster VM manager and its virtual machine managers 133 can re-assign virtual machines 132 to different nodes 110 when priorities change for those virtual machines. In the case of "daytime" and "night-time" assignments, the cluster VM manager and its virtual machine managers 133 could, at the time when a switch is designated, exchange virtual machines 132 between a $1^{st}$ set of high-priority real devices, and a $2^{nd}$ set of low-priority real devices. In such cases, the $1^{st}$ set of high-priority real devices could simply be a larger set of nodes 110 with a greater total capacity, while the $2^{nd}$ set of low-priority real devices could simply be a smaller set of nodes 110 (even a single node 110) with smaller total capacity. This has the effect that the smaller total capacity suffices, even though its virtual machines 132 might need more capacity in total, because those low-priority virtual machines 132 are relatively quiescent at that time.

Fail-Over Reassignment

In one embodiment, the cluster VM manager and its virtual machine managers 133 can also re-assign virtual machines 132 to different nodes 110 as a fail-over method. Because the storage component of each node 110 is fault tolerant, no virtual machine 132 loses stored data (that is, data on virtual disk) even if the entire node 110 fails. This has the effect that the virtual machine 132 can be transferred to another node 110 and restarted, without effect on the virtual machine's operation. The transferred virtual machine 132 can be transferred back when the problem is fixed.

For example, the cluster VM manager and its virtual machine managers 133 can re-assign virtual machines 132 to different nodes 110 when any of those nodes 110 fails, or when any critical element of those nodes 110 fails. In one such example, a node 110 with two large disk drives, thus able to support a virtual machine 132 needing a large amount of disk space, can lose one of those disk drives, making the node 110 untenable for that virtual machine 132. The virtual machine manager 133 could then transfer that virtual machine 132 to another node 110.

In one embodiment, the cluster VM manager and its virtual machine managers 133 can use a separate ($2^{nd}$) cluster 101 for fail-over capacity. The operator of the $1^{st}$ cluster 100 might also operate a $2^{nd}$ cluster 101, possibly earlier equipment that is not as fast or has lesser capacity, or has been mothballed for some other reason, but still coupled to the $1^{st}$ cluster 100 using a LAN 140 or other network. If a failure occurs on the $1^{st}$ cluster 100, and (as a result) there becomes insufficient capacity to host virtual machines 132 on the $1^{st}$ cluster 100 after it is reconfigured, the cluster VM manager and its virtual machine managers 133 can re-assign one or more virtual machines 132 to nodes 110 on that $2^{nd}$ cluster 101. The $2^{nd}$ cluster 101 can be located on a LAN, an enterprise network, remotely on the Internet, or otherwise.

Cloud Reassignment

In one embodiment, the cluster VM manager and its virtual machine managers 133 can also re-assign virtual machines 132 to excess capacity located in the cloud.

For example, a service can provide one or more $3^{rd}$ clusters 102 available for use upon request. In one such case, this could be a client-server arrangement where the server 150 receives requests from $1^{st}$ clusters 101 and supplies resources from its one or more $3^{rd}$ clusters 102.

Cloud Cluster Method of Doing Business

In one embodiment, as described herein, a service can provide one or more clusters 102 available for use upon request. For example, this could be a client-server business arrangement in which the customer (client) purchases excess cluster 100 capacity from a provider (servicer) on those occasions when desired. As the provider has a unique type of device—a distributed fault-tolerant cluster with mobile virtual machines—this would be a service quite different from providing only processing power or only storage.

In exchange, the servicer provides a server 150 with access to one or more clusters 102 on which the client's virtual machines 132 can be hosted, and allows the cluster VM manager and its virtual machine managers 133 to provide information with respect to priority of those virtual machines 132. Client-server requests in which the customer's virtual machines 132 are acting in the role of a server to another device acting in the role of a client would be redirected to the one or more $3^{rd}$ clusters 102.

For a $1^{st}$ example, the provider could establish one or more $3^{rd}$ clusters 102 in a substantially similar form as the client's own $1^{st}$ cluster 100, and allow the client's own cluster VM manager and its virtual machine managers 133 to manage those one or more $3^{rd}$ clusters 102 as if they were extensions of the $1^{st}$ cluster 100. In one example, the provider would provide such $3^{rd}$ clusters 102 in virtualized form and allow the client's cluster VM manager and its virtual machine managers 133 to manage only the virtualized form of those $3^{rd}$ clusters 102.

For a $2^{nd}$ example, the provider could establish one or more $3^{rd}$ clusters 102 having devices differing from the client's own cluster 100, and allow the client's own cluster VM manager and its virtual machine managers 133 only to indicate its priorities among virtual machines 132 to be executed on those $3^{rd}$ clusters 102. In such examples, the provider could provide a very large cluster $3^{rd}$ 102 with the flexibility to run many thousands of virtual machines 132, and with a sophisticated cluster VM manager and its virtual machine managers 133 of its own, with the effect of providing the client's virtual machines 132 with better resources that the client's own $1^{st}$ cluster 100 could provide.

The provider could charge the customer in response to the number of requests for service, the number of virtual machines, a measure of the amount of resources those virtual machines require, a combination or conjunction thereof, or otherwise. The provider could, in addition or instead, charge the customer in response to a measure of the difficulty the provider has in fitting the client's virtual machines into the provider's cluster, with the effect of charging the client more when there is more demand for the provider's service. The provider could, in addition or instead, charge the customer in response to a periodic rate, such as a monthly or yearly subscription fee.

Figure 2:
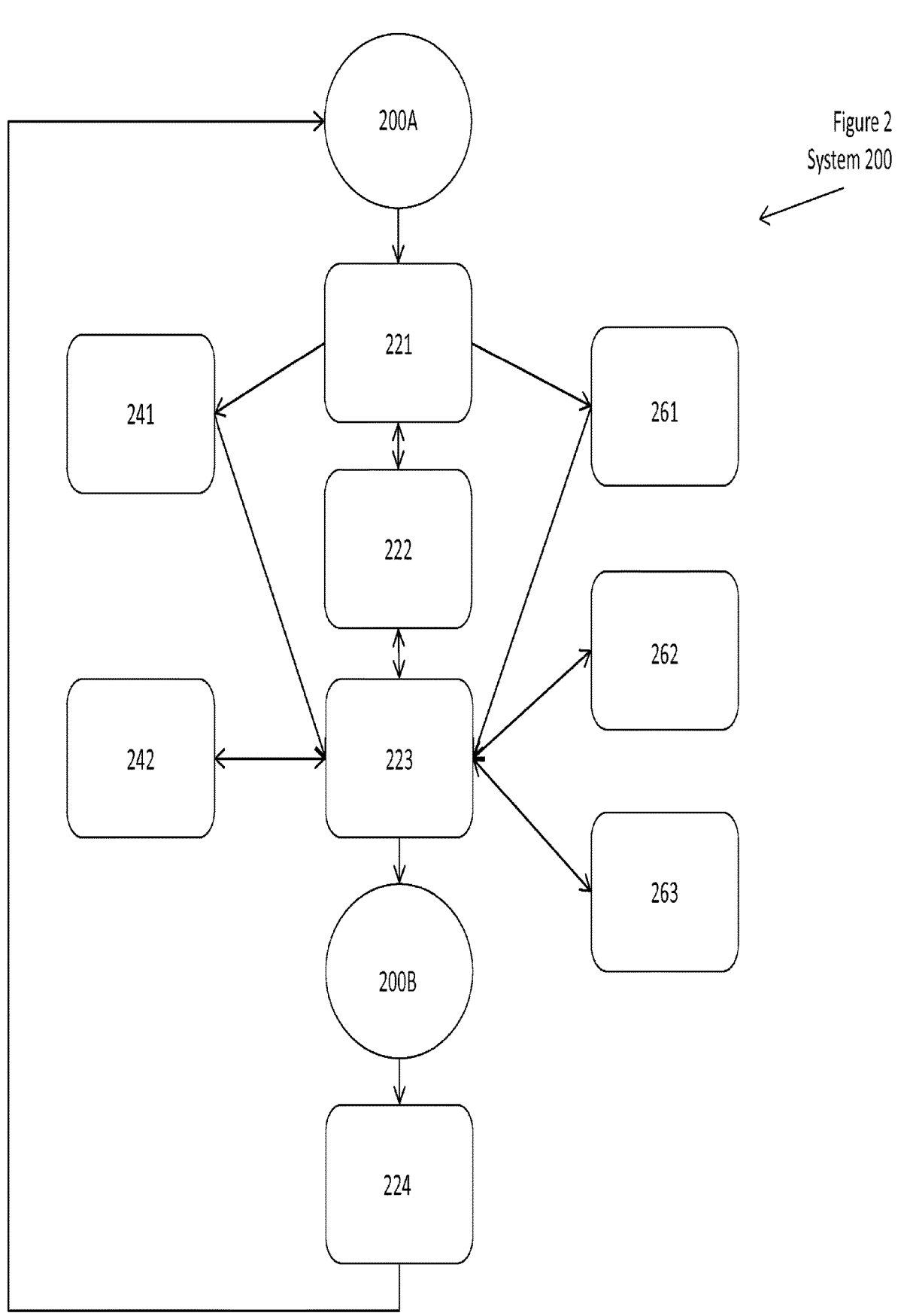
FIG. 2 shows a conceptual block diagram of a $1^{st}$ method.

FIG. 2 shows a conceptual block diagram of a $1^{st}$ method.

The method 200 includes flow points and steps. Although the flow points and steps are described in a particular order, this order is not required. The flow points and steps can be performed in a different order, or in a parallel or pipelined manner. Where the method 200 is said to perform a task, one or more of the components of the system, including without limitation the $1^{st}$ cluster 100, the $2^{nd}$ cluster 101, or the $3^{rd}$ cluster, takes a part in performing that task or directing that task to be performed.

A flow point 200A indicates a beginning of the method. The method 200 can be performed any time there is a change in configuration of virtual machines and node resources, including the possibility of a priority change due to passage of time.

At a step 221, the cluster VM manager and its individual virtual machine managers 133 are initiated. For example, the cluster VM manager collects information about each of its virtual machine managers 133, and the virtual machine managers 133 collectively communicate to effect collaboration.

At an (optional) step 222, the cluster VM manager and its individual virtual machine managers 133 attempt to construct a predictive model of when particular virtual machines 132 will require resources, which resources they are likely to require, and how much of those resources they are likely to require.

At a step 241, a new virtual machine 132 enters the $1^{st}$ cluster 100, such as by being started, or by being transferred from a $2^{nd}$ cluster 101.

At a step 261, the cluster VM manager and its individual virtual machine managers 133 identify the resources available at the $1^{st}$ cluster 200, such as disk space, memory, disk I/O, network bandwidth, and other resources.

At a step 223, the cluster VM manager and its individual virtual machine managers 133 attempt to find the best fit for the presented virtual machines 132 (in view of their resource requirements) on the available $1^{st}$ cluster 200 (in view of its available resources), in view of any constraints that have been imposed by a user or operator.

At a step 242, the cluster VM manager and its individual virtual machine managers 133 determine if it is necessary to transfer a virtual machine 132 to a $2^{nd}$ cluster 101 or a $3^{rd}$ cluster 102. If so, the transfer is made. Either way, the method 200 returns to the step 223.

At a step 262, the cluster VM manager and its individual virtual machine managers 133 determines if it is possible to find additional resources at a $2^{nd}$ cluster 101, such as a cluster nearby and available to the $1^{st}$ cluster 100. If so, the cluster VM manager and its individual virtual machine managers 133 attempt to offload some of their excess resource demand to that $2^{nd}$ cluster 101. Either way, the method 200 returns to the step 223.

At a step 263, the cluster VM manager and its individual virtual machine managers 133 determines if it is possible to use "cloud burst" mode, in which it seeks additional resources from a server 150 at a $3^{rd}$ cluster provider of resources. If so, the cluster VM manager and its individual virtual machine managers 133 attempt to offload some of their excess resource demand to that $3^{rd}$ cluster. Either way, the method 200 returns to the step 223.

A flow point 200B indicates an end of the method. The method 200 can be restarted by a trigger, such as a new virtual machine 132, new resources, failure of old resources, user or operator intervention, or otherwise.

As indicated by an (optional) step 224, if the method is retriggered, the method 200 returns to the flow point 200A.

Figure 3:
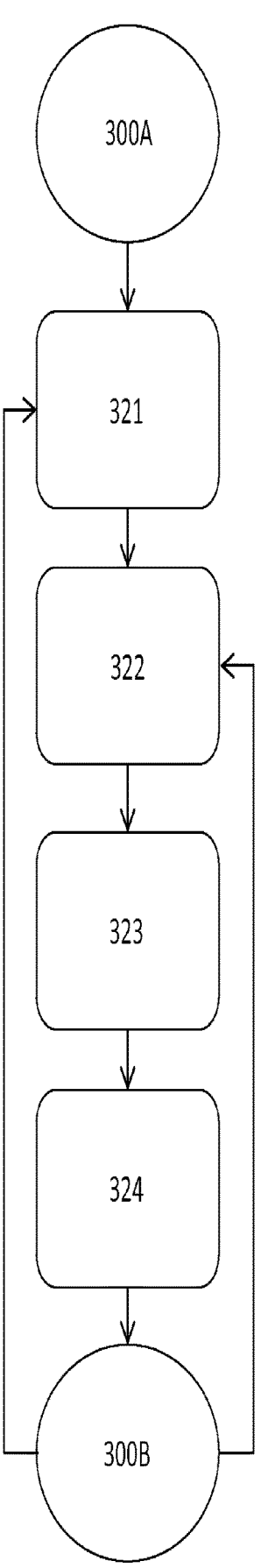
FIG. 3 shows a conceptual block diagram of a $2^{nd}$ method.
Figure 3:
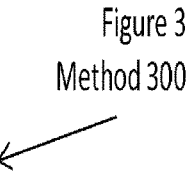

FIG. 3 shows a conceptual block diagram of a $2^{nd}$ method.

The method 300 includes flow points and steps. Although the flow points and steps are described in a particular order, this order is not required. The flow points and steps can be performed in a different order, or in a parallel or pipelined manner. Where the method 300 is said to perform a task, one or more of the components of the system, including without limitation the $1^{st}$ cluster 100, the $2^{nd}$ cluster 101, or the $3^{rd}$ cluster, takes a part in performing that task or directing that task to be performed.

A flow point 300A indicates a beginning of the method. The method 300 can be performed any time there is a reference to a "cloud burst" configuration of virtual machines and node resources.

At a step 321, a customer presents an incoming request for virtual machine 132 resources is received at the server 150.

At a step 322, the method 300 allocates virtual machine 132 resources from among its "cloud" available resources.

At a step 323, the method 300 manages the requirements for virtual machine 132 resources in view of its available resources.

At a step 324, the method 300 charges the customer in response to the resources requested, the resources used, the effort required to fit those requested resources into the cloud, on in response to some other technique.

A flow point 300B indicates an end of the method. The method 300 can repeat at the flow point 300A. If there are changes in requests for virtual machine 132 resources, the method 300 proceeds with the earlier step 321. If there are changes in available resources, the method 300 proceeds with the earlier step 322.

Alternative Embodiments

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The invention claimed is:

1. A method, including steps of identifying a category of application programs into which a selected virtual machine fits;

identifying a current workplace usage associated with a distributed fault-tolerant multiprocessor cluster, to provide a preferred set of real devices on which to execute the selected virtual machine;

transferring one or more virtual machines, including the selected virtual machine, between real devices in the distributed fault-tolerant multiprocessor cluster, in response to a set of time-changing resource requirements;

measuring use of a plurality of different resources by the selected virtual machine;

providing a model of future actual resource usage by the selected virtual machine in response to the steps of measuring, wherein the steps of identifying a category are responsive to the model of future resource usage by the selected virtual machine; and predicting said set of time-changing resource requirements in response to the current workplace usage and a result of the steps of identifying a category;

wherein the step of transferring includes steps of halting a particular one virtual machine;

reallocating a new set of real devices to said particular one virtual machine; and restarting said particular one virtual machine;

wherein said particular one virtual machine does not know the step of transferring has occurred.

2. The method as in claim 1, wherein the step of transferring one or more virtual machines is responsive to the set of time-changing resource requirements.

3. The method as in claim 1, further comprising predicting said set of time-changing resource requirements in response to past behavior of one or more said virtual machines.

4. A distributed fault-tolerant multiprocessor cluster including one or more real devices disposed to execute one or more virtual machines, wherein the one or more real devices are disposed to collectively perform steps of identifying a category of application programs into which a selected one or more of the virtual machines fits;

identifying a current workplace usage associated with the distributed fault-tolerant multiprocessor cluster, to provide a preferred set of the one or more real devices on which to execute the selected one or more of the virtual machines;

transferring one or more of the virtual machines, including the selected one or more virtual machines, between the one or more real devices in the distributed fault-tolerant multiprocessor cluster, in response to a set of time-changing resource requirements;

measuring use of a plurality of different resources by the selected one or more virtual machines;

providing a model of future actual resource usage by the selected virtual machine in response to the steps of measuring, wherein the steps of identifying a category are responsive to the model of future resource usage by the selected virtual machine; and predicting said set of time-changing resource requirements in response to the current workplace usage and a result of the steps of identifying a category;

wherein the step of transferring includes steps of halting a particular one virtual machine;

reallocating a new set of real devices to said particular one virtual machine; and restarting said particular one virtual machine;

wherein said particular one virtual machine does not know the step of transferring has occurred.

5. A distributed fault-tolerant multiprocessor cluster as in claim 4, wherein the step of transferring one or more virtual machines is responsive to the set of time-changing resource requirements.

6. A distributed fault-tolerant multiprocessor cluster as in claim 4, wherein the steps further comprise predicting said set of time-changing resource requirements in response to past behavior of virtual machines.

7. A method of operating a distributed fault-tolerant multiprocessor cluster, including steps of measuring use of resources by one or more virtual machines in the distributed fault-tolerant multiprocessor cluster, the use of resources disposed to vary over a time duration;

generating at least one model of resource usage by each such one or more virtual machines, the model having a time-varying component; and allocating resources to the one or more virtual machines in response to a time-varying prediction by the at least one model;

wherein the step of allocating resources includes steps of transferring one or more virtual machines between a first set of re-sources and a second set of resources available at the distributed fault-tolerant multiprocessor cluster, wherein the steps of transferring include steps of halting a particular one virtual machine;

reallocating a new set of resources to said particular one virtual machine; and restarting said particular one virtual machine;

wherein said particular one virtual machine does not know the step of transferring has occurred.

8. A method as in claim 7, wherein the model distinguishes between daily work and background applications.

9. A method as in claim 7, wherein the steps of generating include steps of determining a category into which a selected virtual machine fits.

10. A method as in claim 7, wherein the model includes a time of day during which the virtual machine is to execute, for which the time-varying prediction is made.

11. A distributed fault-tolerant multiprocessor cluster including one or more real devices disposed to execute one or more virtual machines, wherein the one or more real devices perform at least steps of measuring use of resources by the one or more virtual machines over a time duration;

generating at least one model of resource usage by each such one or more virtual machines; and allocating resources to the one or more virtual machines in response to the at least one model;

wherein the step of allocating resources includes steps of transferring one or more virtual machines between a first set of re-sources and a second set of resources available at the distributed fault-tolerant multiprocessor cluster, wherein the step of transferring includes steps of halting a particular one virtual machine;

reallocating a new set of resources to said particular one virtual machine; and restarting said particular one virtual machine;

wherein said particular one virtual machine does not know the step of transferring has occurred.

12. A distributed fault-tolerant multiprocessor cluster as in claim 11, wherein the model distinguishes between daily work and background applications.

13. A distributed fault-tolerant multiprocessor cluster as in claim 11, wherein the steps of generating includes steps of determining a category into which a selected virtual machine fits.

14. A distributed fault-tolerant multiprocessor cluster as in claim 11, wherein the category includes a time of day.

* * * * *